United States Patent
Lunde (10) Patent No.: US 9,813,524 B2
(45) Date of Patent: Nov. 7, 2017

(54) DYNAMIC SHARING AND UPDATING OF AN ELECTRONIC FORM

(75) Inventor: Fredrik Lunde, Malmö (SE)

(73) Assignee: Vergic Group AB, Malmo (SE)

( * ) Notice: Subject to any disclaimer, the term of this patent is extended or adjusted under 35 U.S.C. 154(b) by 710 days.

(21) Appl. No.: 13/368,094

(22) Filed: Feb. 7, 2012

(65) Prior Publication Data

US 2013/0205188 A1     Aug. 8, 2013

(51) Int. Cl.
| | |
|---|---|
| *G06F 17/00* | (2006.01) |
| *H04L 29/06* | (2006.01) |
| *G06F 17/24* | (2006.01) |
| *H04L 29/08* | (2006.01) |

(52) U.S. Cl.
CPC ............ *H04L 67/42* (2013.01); *G06F 17/243* (2013.01); *H04L 67/02* (2013.01); *H04L 67/22* (2013.01)

(58) Field of Classification Search
CPC .................................................... G06F 17/243
USPC ......................................................... 715/224
See application file for complete search history.

(56) References Cited

U.S. PATENT DOCUMENTS

| | | | |
|---|---|---|---|
| 8,527,591 B2 | 9/2013 | Pirnazar | |
| 9,171,087 B2 | 10/2015 | Pirnazar | |
| 9,185,145 B2 | 11/2015 | Pirnazar | |
| 9,483,448 B2 | 11/2016 | Pirnazar | |
| 9,489,353 B2 | 11/2016 | Pirnazar | |
| 2002/0103858 A1 | 8/2002 | Bracewell et al. | |
| 2004/0024842 A1 | 2/2004 | Witt | |
| 2010/0217682 A1* | 8/2010 | Chan | 705/26 |
| 2012/0166970 A1* | 6/2012 | Gastaldi et al. | 715/753 |

OTHER PUBLICATIONS

International Search Report and Written Opinion for corresponding International Patent Application No. PCT/EP2013/052116, dated Jun. 5, 2013.
"Adding forms to your site with Yola's Form Widget," Jan. 21, 2012, retrieved May 10, 2017 from <https://web.archive.org/web/20120121090418/https:/www.yola.com/tutorials/article/Yola-Form-Widget-1285944437088/Adding_and_editing_content>.

* cited by examiner

*Primary Examiner* — Shawn S Joseph
(74) *Attorney, Agent, or Firm* — Snyder, Clark, Lesch & Chung, LLP (57) ABSTRACT

A terminal comprising a memory and a controller is disclosed. The controller is configured to receive a selection of at least one field, analyze said at least one selected field, generate a rendering template for said at least one selected field, share said rendering template with a visitor terminal via a server, receive data being associated with said rendering template from said visitor terminal, match said received data to said at least one selected field, and input said received data into said at least one selected field.

12 Claims, 8 Drawing Sheets

DYNAMIC SHARING AND UPDATING OF AN ELECTRONIC FORM

CO-RELATED APPLICATIONS

This patent application is filed concurrently with a patent application titled DYNAMIC FILTERING AND SORTING OF VISITORS FOR PROVIDING ASSISTANCE by the same applicant, which patent application is hereby incorporated by reference.

This patent application is filed concurrently with a patent application titled DYNAMIC SHARING OF A WEBSERVICE by the same applicant, which patent application is hereby incorporated by reference.

TECHNICAL FIELD

This application relates to a method, an apparatus and a computer program product for updating an electronic form, and in particular to a method, an apparatus and a computer program product for dynamic sharing and updating of an electronic form.

BACKGROUND

In today's society many companies invest heavily in establishing an electronic business focused at providing customers with electronic commerce possibilities. Many authorities are also looking to providing network enabled services such as offering various registrations and information services through computer enabled network services. Companies and institutions also invest in providing online registration. Electronic commerce, commonly known as e-commerce, ecommerce or e-comm, refers to the buying and selling of products or services over electronic systems such as the Internet and other computer networks.

However, due to the large number of currently used operating systems and the even larger number of computer software for these operating systems it is a huge effort to transform a document such as an electronic form into a format that can be used by all different operating systems and software. Not only does the display format of the document or form be transformed, so must also the data to be input into the forms. The situation grows even more complex when electronic forms that are specific to an application are taken into account and that needs to be shared.

To accomplish an easy sharing of documents such as forms Adobe Systems® created their Portable Document Format in 1993 and became free for use in 2001. Portable Document Format (PDF) is an open standard for document exchange. This file format is used for representing documents in a manner independent of application software, hardware, and operating systems. Each PDF file encapsulates a complete description of a fixed-layout flat document, including the text, fonts, graphics, and other information needed to display it.

The PDF is a highly usable format, but it still requires that a document is transformed into a PDF. It also requires that both the creator and the reader have software than can read PDF. And, more importantly, it requires that the reader/writer has special software for editing a PDF. The PDF format is, however, not suitable for all electronic forms including application specific forms.

As would be clear to any skilled person the costs of transforming all data for various applications' forms would be very high.

There is thus a need to be able to share an electronic form for any purpose and of any origin, such as an application specific form, to allow a user to input data into the form and have the form be accepted by the application related to the form.

SUMMARY

It is an object of the teachings of this application to overcome the problems listed above by providing a terminal comprising a memory and a controller is disclosed. The controller is configured to receive a selection of at least one field, analyze said at least one selected field, generate a rendering template for said at least one selected field and share said rendering template with a visitor terminal possibly via a server. In one embodiment the terminal is further configured to receive data being associated with said rendering template from said visitor terminal, match said received data to said at least one selected field, and input said received data into said at least one selected field.

It is also an object of the teachings of this application to overcome the problems listed above by providing a method comprising receiving a selection of at least one field, analyzing said at least one selected field, generating a rendering template for said at least one selected field and sharing said rendering template with a visitor terminal possibly via a server. In one embodiment the method according to above further comprises receiving data being associated with said rendering template from said visitor terminal, matching said received data to said at least one selected field, and input said received data into said at least one selected field.

In one embodiment the method according to above further comprise identifying at least one customer terminal as the customer terminal accesses a web service, monitor actions taken by said customer terminal, sorting said customer terminal, initiating an assistance session, generating a copy of said web service, providing said copy to said customer terminal and an operator terminal thereby sharing the customer specific copy between the customer terminal and the operator terminal, and sharing said rendering template by injecting said rendering template into a data flow established between said customer terminal and said server.

It is also an object of the teachings of this application to overcome the problems listed above by providing a computer program product or computer readable storage medium encoded with instructions that, when executed on a processor, performs the method according to above.

It is also an object of the teachings of this application to overcome the problems listed above by providing a visitor terminal comprising a memory and a controller, wherein said controller is configured to: receive and display a graphical representation of a rendering template as a form, preferably in a web browser as part of a shared view of a web service, receive data being associated with a field, and to forward said data to an operator terminal.

The authors of the present application have realized, after inventive and insightful reasoning that by utilizing the already established and existing internet connection and the protocols for the internet connection data can be sent between terminals without having to undergo special transformations.

One benefit of the teachings herein is that by selecting and identifying a field based on its graphical position an easy to implement and handle manner of handling a form is provided. This allows for manipulation and sharing of any form in a wide range of operating systems and is essentially independent on the operating systems or coding standards being executed on the visitor terminal and the operator terminal.

The teachings herein find use in online registration services and also in online shops, ordering services or other services. The teachings herein also find beneficial use in systems of online services allowing a multitude of services to be supported by one service agent or operator having access to multiple data bases, all possibly having a different coding standard or operating system due to the versatility of the system disclosed herein.

Other features and advantages of the disclosed embodiments will appear from the following detailed disclosure, from the attached dependent claims as well as from the drawings.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of the element, device, component, means, step, etc., unless explicitly stated otherwise. The actions of any method disclosed herein do not have to be performed in the exact order disclosed, unless explicitly stated.

BRIEF DESCRIPTION OF DRAWINGS

The invention will be described in further detail under reference to the accompanying drawings in which.

DETAILED DESCRIPTION

The disclosed embodiments will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout.

Figure 1:
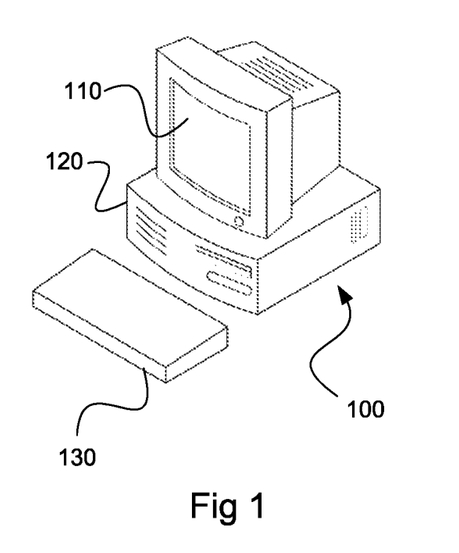
FIG. 1 is a schematic view of a terminal according to the teachings herein.

FIG. 1 shows a communications apparatus 100 according to an embodiment herein. In one embodiment the communication apparatus 100 is configured for network communication, either wireless or wired. In one embodiment the communication apparatus 100 is configured for network communication, both wireless and wired. Examples of such a communication apparatus 100 are: a personal computer, desktop or laptop, an internet tablet, a mobile telephone, a smart phone, a personal digital assistant and a work station.

The communication apparatus 100 will hereafter be exemplified and described as being a personal computer 100. The personal computer or terminal 100 comprises a display 110 and a housing 120. The housing comprises a controller or CPU (not shown) and one or more computer-readable storage mediums (not shown), such as storage units and internal memory. Examples of storage units are disk drives or hard drives. The terminal 100 further comprises at least one data port. Data ports can be wired and/or wireless. Examples of data ports are USB (Universal Serial Bus) ports, Ethernet ports or Wi-Fi (according to IEEE standard 802.11) ports. Data ports are configured to enable a terminal 100 to connect with other terminals or a server.

The terminal 100 further comprises at least one input unit such as a keyboard 130. Other examples of input units are computer mouse, touch pads, touch screens or joysticks to name a few.

Figure 2:
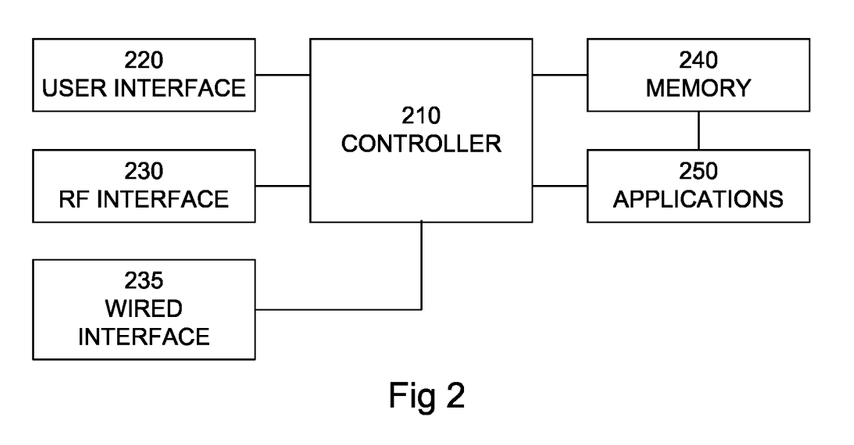
FIG. 2 is a schematic view of the components of a terminal according to the teachings herein.

FIG. 2 shows a schematic view of the general structure of a terminal according to FIG. 1. The terminal 200 comprises a controller 210 which is responsible for the overall operation of the terminal 200 and is preferably implemented by any commercially available CPU ("Central Processing Unit"), DSP ("Digital Signal Processor") or any other electronic programmable logic device. The controller 210 may be implemented using instructions that enable hardware functionality, for example, by using executable computer program instructions in a general-purpose or special-purpose processor that may be stored on a computer readable storage medium (disk, memory etc) 240 to be executed by such a processor. The controller 210 is configured to read instructions from the memory 240 and execute these instructions to control the operation of the terminal 200. The memory 240 may be implemented using any commonly known technology for computer-readable memories such as ROM, RAM, SRAM, DRAM, CMOS, FLASH, DDR, EEPROM memory, flash memory, hard drive, optical storage or any combination thereof. The terminal 200 further comprises one or more applications 250. The applications are sets of instructions that when executed by the controller 210 control the operation of the terminal 200. The memory 240 is used for various purposes by the controller 210, one of them being for storing application data and program instructions 250 for various software modules in the terminal 200. The software modules include a real-time operating system, drivers for a man-machine interface 220, an application handler as well as various applications 250. The applications 250 can include a messaging application such as electronic mail, a browsing application, a media player application, as well as various other applications 250, such as applications for voice calling, video calling, document reading and/or document editing, an instant messaging application, a calendar application, a control panel application, one or more video games, a notepad application, etc.

The terminal 200 further comprises a user interface 220, which in the terminal 100 of figure of 1, is comprised of the display 110, the keypad 130. The user interface (UI) 220 also includes one or more hardware controllers, which together with the UI drivers cooperate with the display 110, keypad 130, as well as various other I/O devices such as sound system, LED indicator, etc. As is commonly known, the visitor may operate the terminal 200 through the man-machine interface thus formed.

The terminal 200 further comprises a radio frequency interface 230, which is adapted to allow the terminal to communicate with other devices through a radio frequency band through the use of different radio frequency technologies. Examples of such technologies are WIFI, Bluetooth®, W-CDMA, GSM, UTRAN, LTE, and NMT to name a few.

The terminal 200 further comprises a wired interface 235, which is adapted to allow the terminal to communicate with other devices through the use of different network technologies. Examples of such technologies are USB, Ethernet, and Local Area Network, TCP/IP (Transport Control Protocol/Internet Protocol) to name a few.

The controller 210 is configured to operably execute applications 250 such as the web browsing or email application through the RF interface 230 and/or the wired interface 235 using software stored in the memory 240 which software includes various modules, protocol stacks, drivers, etc. to provide communication services (such as transport, network and connectivity) for the RF interface 230 and the wired interface 235, and optionally a Bluetooth interface and/or an IrDA interface for local connectivity. The RF interface 230 comprises an internal or external antenna as well as appropriate radio circuitry for establishing and maintaining a wireless link to a base station. As is well known to a person skilled in the art, the radio circuitry comprises a series of analogue and digital electronic components, together forming a radio receiver and transmitter. These components include, i.e., band pass filters, amplifiers, mixers, local oscillators, low pass filters, AD/DA converters, etc.

Figure 3:
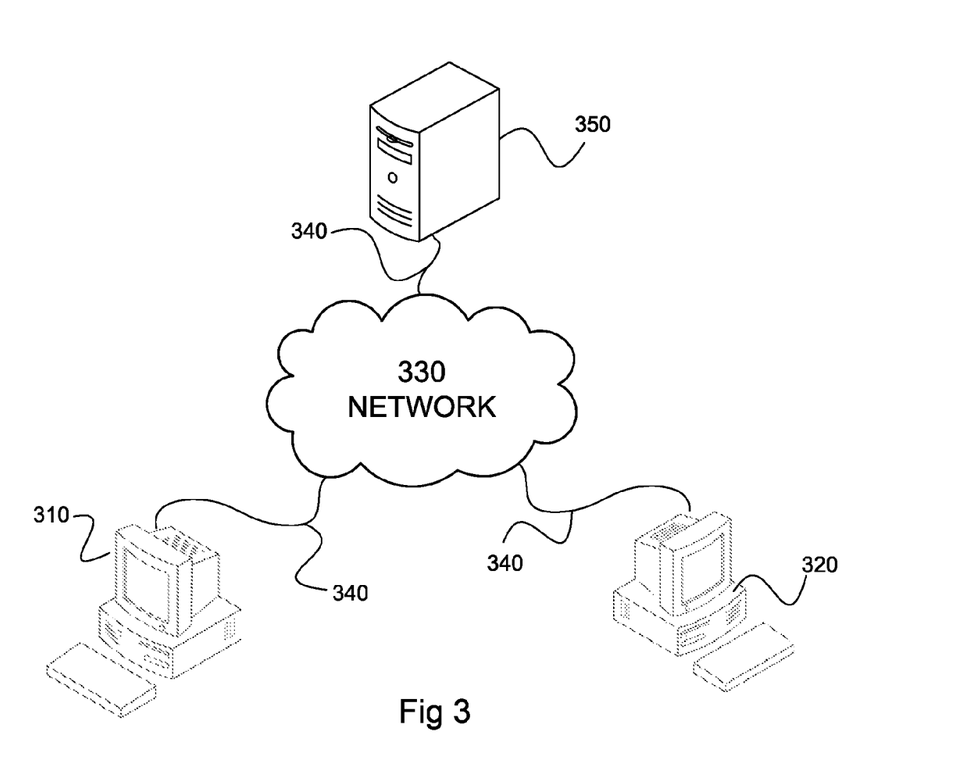
FIG. 3 is a schematic view of a general view of a computer network according to the teachings herein.

FIG. 3 shows a schematic overview of a computer network 300 according to an embodiment herein. A terminal 310, 320, such as the terminals 100, 200 of FIG. 1 or 2, is connected to the internet 330. In FIG. 3 there are two terminals 310 and 320. The computer network further comprises at least one server 350. In FIG. 3 only one server 350 is shown, but it should be noted that any number of servers 350 may be implemented in a computer network 300. Generally a server is a physical computer (a hardware system) dedicated to running one or more services (as a host), to serve the needs of visitors of the other computers or terminals 310, 320 on the network 300. Depending on the computing service that it offers it could be a database server, file server, mail server, print server, web server, or other.

In one embodiment the server 350 is a web server 350. Generally, a web server 350 can refer to either hardware (a computer) or software (a computer application) that helps to deliver content that can be accessed through the Internet 330.

The Internet 330 is a global system of interconnected computer networks that use the standard Internet protocol suite (TCP/IP—Transmission Control protocol/Internet Protocol) to serve billions of visitors worldwide. It is a network of networks that consists of millions of private, public, academic, business, and government networks, of local to global scope, that are linked by a broad array of electronic, wireless and optical networking technologies. The Internet carries a vast range of information resources and services, such as the inter-linked hypertext documents of the World Wide Web (WWW) and the infrastructure to support communication applications such as email and Voice over Internet Protocol (VoIP) to name a few. The communications infrastructure of the Internet 330 consists of its hardware components; such as servers and terminals and a system of software layers arranged in protocols according to an internet model that control various aspects of the architecture. The most prominent component of the Internet model is the Internet Protocol (IP), which provides addressing systems (IP addresses) for computers on the Internet. In one embodiment the terminals 310, 320 are configured to communicate over the internet through a data channel 340 via a web browser application using a so called WebSocket. WebSocket is a technology providing for bi-directional, full-duplex communications channels, over a single Transmission Control Protocol (TCP) socket. It is designed to be implemented in web browsers and web servers, but it can be used by any client, such as a terminal, or server application. In one embodiment a server 350 is a program or a computer comprising a program that operates as a socket listener.

As would be apparent to a skilled reader, the internet is full of possibilities and variations of how to connect two terminals and the embodiments disclosed herein are or purely exemplary purposes and should not be construed to be limiting.

It should be noted that even though the description below will be given with focus on an online registration service the teachings herein are also applicable to any online service that services customers or visitors including public, governmental and private services.

Figure 4:
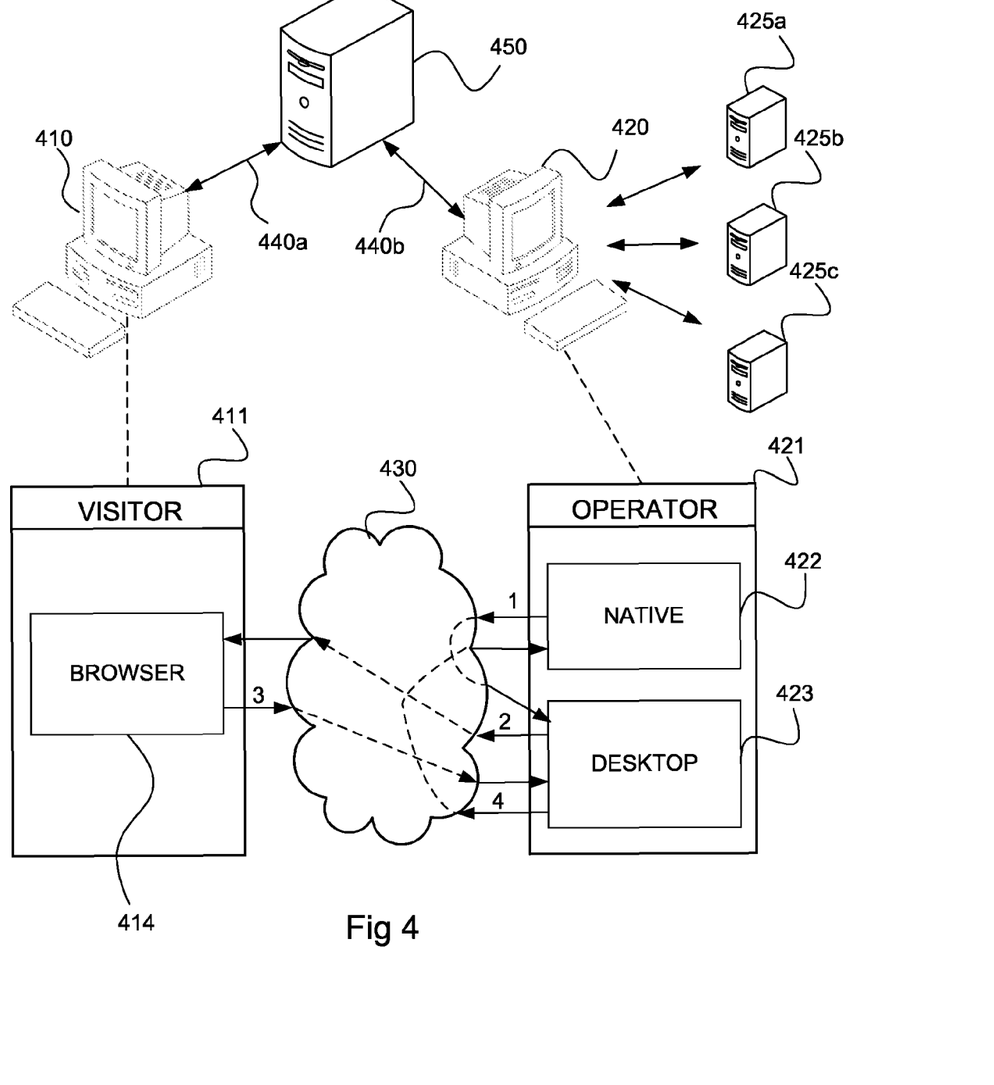
FIG. 4 shows general view of a system according to one embodiment of the teachings of this application.

FIG. 4 shows a general overview system according to herein comprising a client or visitor terminal 410 that is connected 440a to a web service operated and represented by a server 450. Examples of such web services are online registration systems, online shops, online booking systems and online support systems to name a few. An operator terminal 420 is also connected 440b to the web service through the web server 450. The operator terminal 420 is enabled to communicate 440 with the visitor terminal 410 through the server 450 to offer support or assistance. This communication 440 is, in one embodiment, effected through a sharing of the web service as is disclosed in the patent application titled DYNAMIC SHARING OF A WEBSERVICE. The sharing of the web service allows the operator and the visitor to share a view of a webpage and to make alterations to it, without having any control over the other's terminal It should be noted that further details on how the sharing of the web service is achieved are to be found in the patent application titled DYNAMIC SHARING OF A WEBSERVICE which is incorporated herein by reference. It should further be noted that the communication 440 need not be effected through a server 440, but may be effected through a connection between the operator terminal 420 and the visitor terminal 410 as is also disclosed in the patent application titled DYNAMIC SHARING OF A WEBSERVICE which is incorporated herein by reference. The communication 440 can also and additionally be effected through a chat session or through a voice call.

In one embodiment the operator terminal 420 is also connected to at least one support database 425. The support databases 425 may be separate systems, external systems or storage systems stored internally in the operator terminal 420 or the server 450. Examples of support databases 425 include Human Resource systems, credit and banking service systems, image and movie collections to name a few.

The operator terminal 420 is configured to execute software components 421. Examples of these are illustrated by blocks 421, 422 and 423 in FIG. 4. The controller 210 of the operator terminal 420 is configured to execute a native application 422 that is run as a background application. The native application 422 is configured to enable an operator to select a component, such as a form or a field, on a desktop view of the terminal. In the following description the examples given will focus on selecting fields, but it should be noted that the teachings herein can also be applied to selecting and analyzing other objects such as images, videos, documents to name a few. The native application 422 further analyzes the field and forwards it to a desktop application 423 for manipulation by the operator. The forwarding (arrow 1 in FIG. 4) is effected trough a server 450 over the internet 430. This enables a conversion into a web browser format that is independent of the operating system used on the operator terminal. It also enables logging of the action which increases the overall security of the system. The desktop module 423 receives the analyzed field in and makes it available to the operator. The operator shares the analyzed field as an additional object in the shared web service view with the visitor terminal 410 which is indicated by arrow 2 in FIG. 4. Further details on how this sharing is achieved are disclosed in the patent application titled DYNAMIC SHARING OF A WEBSERVICE which is incorporated herein by reference.

The visitor displays and fills in the analyzed field in a browser application 414 and returns the data to the operator, which is indicated by arrow 3 in FIG. 4. The data is received by the operator terminal and is optionally made available to the operator on the desktop. The data is then processed by the native application 422 to correlate the data with the corresponding field and to input the data in to the field, as is indicated by arrow 4 in FIG. 4.

This function will be described below through an illustrating example with simultaneous reference to FIGS. 5, 6, 7, 8 and 10.

Figure 5A:
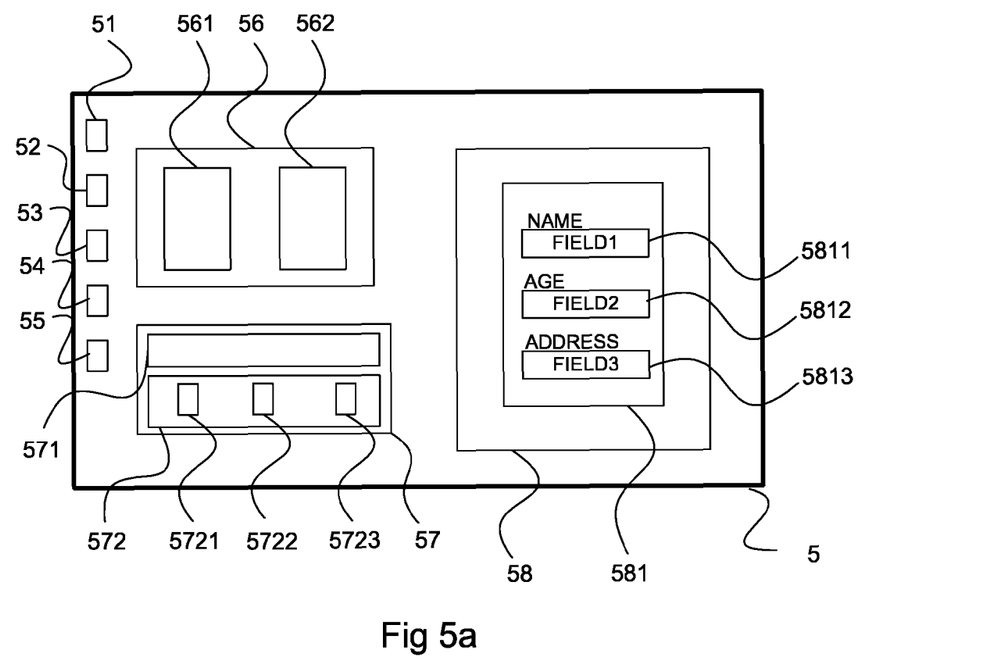
FIGS. 5a, 5b, and 5c each shows a display view of an operator terminal according to one embodiment of the teachings of this application.
Figure 10:
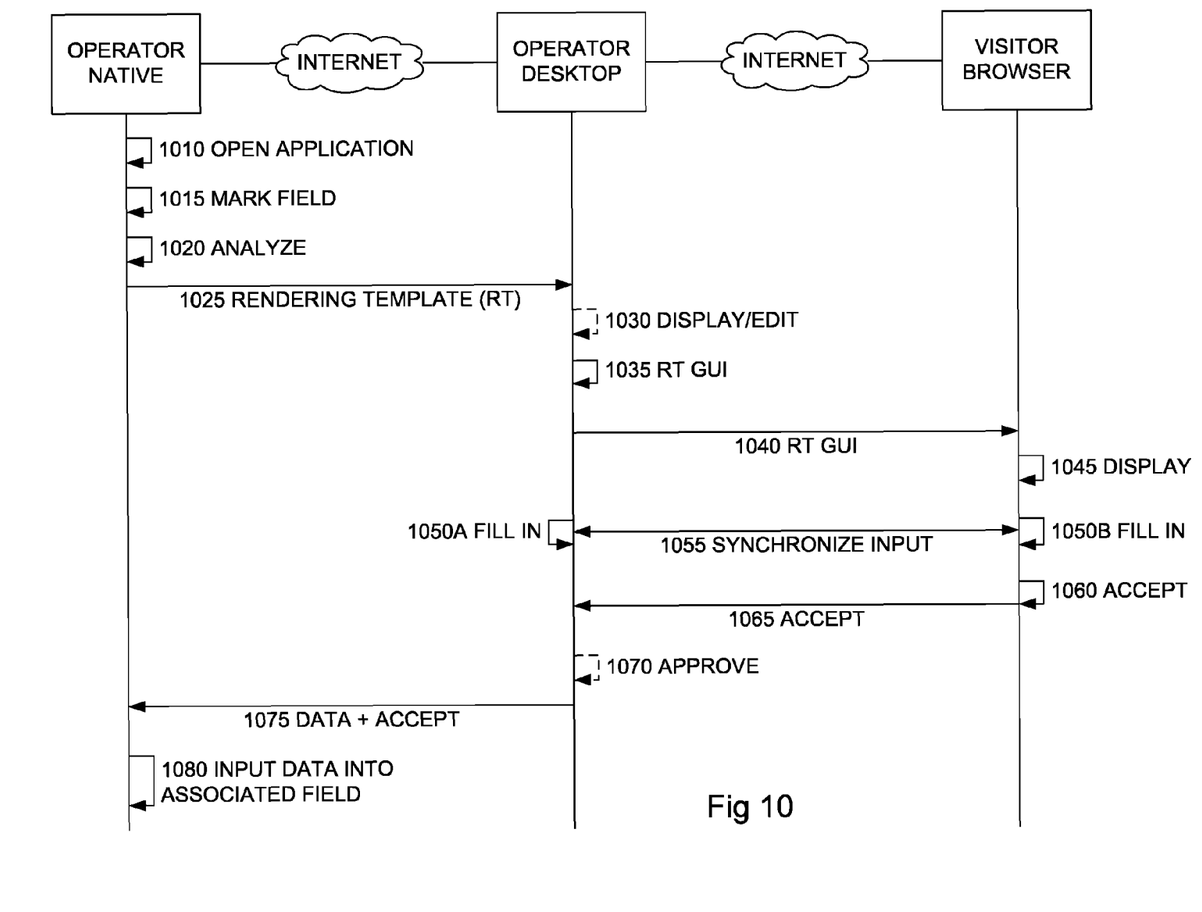
FIG. 10 shows a time-dependency graph for co-operating components according to one embodiment of the teachings of this application.

FIG. 5a shows a user interface view to be displayed on a display (110) of an operator terminal 410. The view comprises a desktop area 5 on which several objects are displayed. Starting on the left 5 icons 51, 52, 53, 54, 55 are displayed along the left edge of the desktop area 5. Next to the icons an upper application window 56 and a lower upper application window 57 are displayed. The upper application window 56 comprises a left object 561 and a right object 562. The lower application window 57 comprises an upper component 571 and a lower component 572. The lower component 572 in turn comprises three icons 5721, 5722 and 5723. On the right-hind side of the desktop area 5 a document application window 58 is displayed. The document application window 58 comprises an electronic form 581 having three fields. The upper field 5811 is labeled "NAME", the middle field 5812 is labeled "AGE" and the lower field 5813 is labeled "ADDRESS". With reference to FIG. 10, which shows a time-dependency graph of a general embodiment of the functionality according to the teachings herein, a first action of opening an application 1010 has thus already been taken in this example. The operator then marks 1015 a number of fields.

In one embodiment the controller 210 of the operator terminal 420 is configured to receive a selection of a field 5811, 5812, 5813 by receiving a graphical user interface (GUI) pointer indication, such as a mouse click, on the field 5811, 5812, 5813 to be selected. This allows an operator to easily select a specific field 5811, 5812, 5813 by simply clicking on it. In one embodiment the controller 210 is configured to receive selections of more than one field. This allows an operator to easily select several fields 5811, 5812, 5813 by simply clicking on them in turn. In one embodiment the controller 210 of the operator terminal 420 is configured to receive a selection of a field 5811, 5812, 5813 by receiving a graphical user interface (GUI) pointer indication, such as a mouse click, on the form 581 thereby selecting all fields 5811, 5812, and 5813 of the form 581. In one embodiment the controller 210 of the operator terminal 420 is configured to receive a selection of a field 5811, 5812, 5813 by receiving a graphical user interface (GUI) pointer indication, such as a mouse click, on, for example, a title bar of an application window 58 thereby selecting all fields 5811, 5812, 5813 of the application window 58. This allows an operator to easily select several fields at once. In one embodiment the controller 210 of the operator terminal 420 is configured to receive a selection of a field 5811, 5812, 5813 by receiving a graphical user interface (GUI) marking indication, such as by indicating a selection area using a mouse on the desktop area 5, thereby selecting all fields within the selection area. This allows an operator to easily and quickly select a set of closely arranged fields with one simple (mouse) action.

Figure 5B:
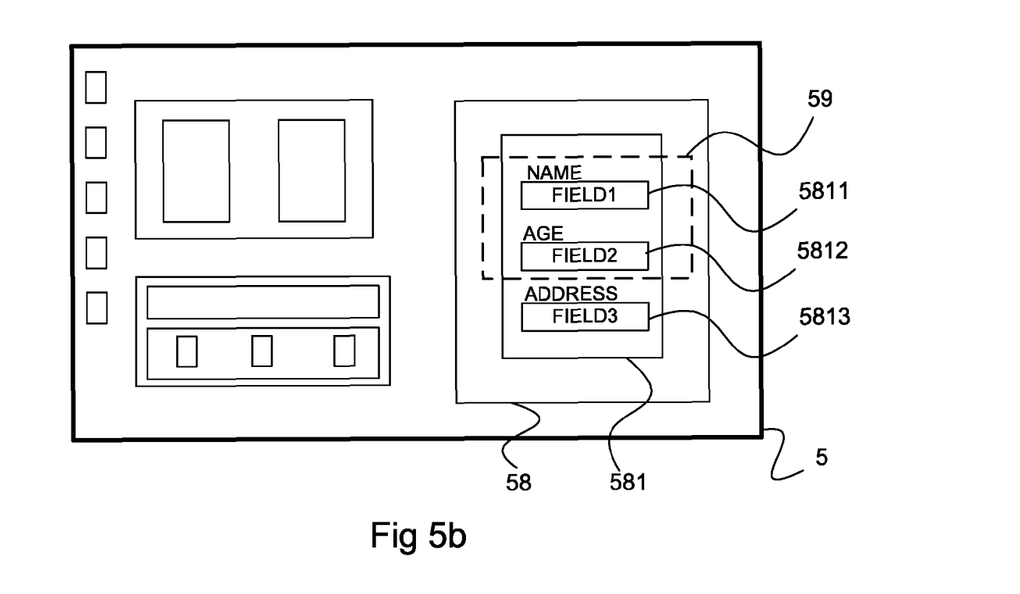

In FIG. 5b the operator has made a selection of the upper field 5811 and the middle field 5812 by indicating a selection area 59 that encompasses the two fields 5811, 5812.

In one embodiment the selection of a field is effected through a matching of the coordinates of the selection with the coordinates of the user interface components.

Figure 7A:
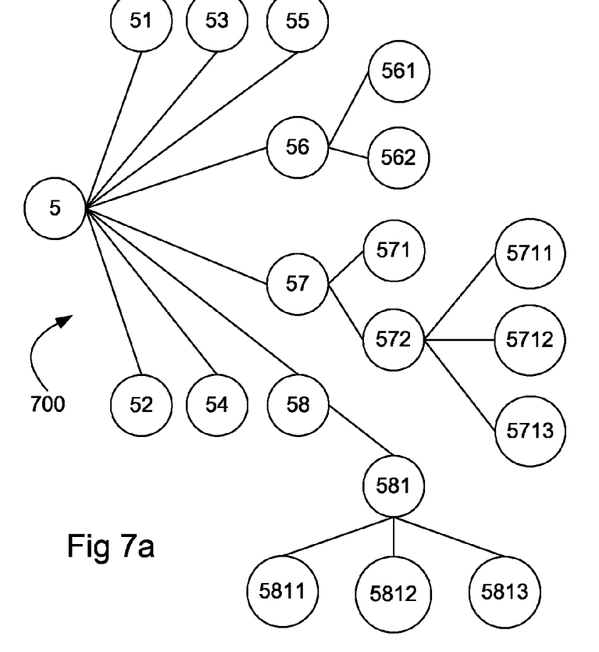
FIGS. 7a and 7b each shows a schematic view of a user interface component tree according to one embodiment of the teachings of this application.
Figure 8:
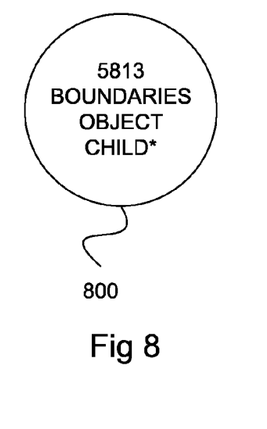
FIG. 8 shows a schematic view of a node of a user interface component tree according to one embodiment of the teachings of this application.

In one embodiment the user interface components 51 to 5813 are arranged in a user interface component tree being an example of an object graph. Such a tree 700 is shown in FIG. 7a. The tree 700 corresponds to the view shown in FIG. 5 and comprises one node for each user interface component. The nodes of FIG. 7a are referenced with the same reference numbers as the user interface components of FIG. 5. For example, the starting node 5 corresponds to the desktop area 5. The starting node 5 has 8 children, one for each icon and application window displayed on the desktop area 5. The nodes in turn have a child for each user interface component that is displayed within the node's user interface component. FIG. 8 shows a general view of such a node 800. A node 800 comprises a reference to the corresponding user interface component OBJECT and the graphical display boundaries of the component BOUNDARIES. In one embodiment the node 800 also comprises reference to its children, if any, CHILD*. The '*' following the reference CHILD indicates that a node 800 has 0 or more children.

The controller is configured to traverse the tree 700 and for each node compare the selected coordinates with the boundaries of the node and thereby matching the selection to at least one field.

For the selection option of marking a selection area 59 the controller 210 is configured to receive a selection area 59, determine the graphical boundaries of the selection area 59, traverse the tree 700 and for every node determine if the node is within the selection area's 59 boundaries.

The traversal of the tree can be implemented in many ways, as would be apparent to a skilled person, but one example is given here below in Pseudo code:

---
Selected area traversal:
---

```
Check(node) {
   check if node is within BOUNDARIES
   If within then
      Analyze(node)
   For every child check(child)
}
Check(root node);
```

For the selection option of clicking on a field or clicking in a form 581 or window 58 the controller 210 is configured to receive an indication of a position, determine coordinates for the position, traverse the tree 700 and for every node, check if coordinates is within the node's boundaries.

The traversal of the tree can be implemented in many ways, as would be apparent to a skilled person, but one example is given here below in Pseudo code:

---
Click selection traversal
---
```
DetermineBoundariesByClick(clickCoordinates) {
if clickCoordinates on title bar
    return titlebar.Parent.Boundaries
return clickCoordinates.Boundaries;
}
Check(node) {
check if node is within BOUNDARIES
If within then
    Analyze(node)
For every child check(child)
}
DetermineBoundariesByClick( );
Check(root node);
```
---

Boundaries may be given by two opposite corners or by a start coordinate and an indication of length and height (or radius).

Figure 7B:
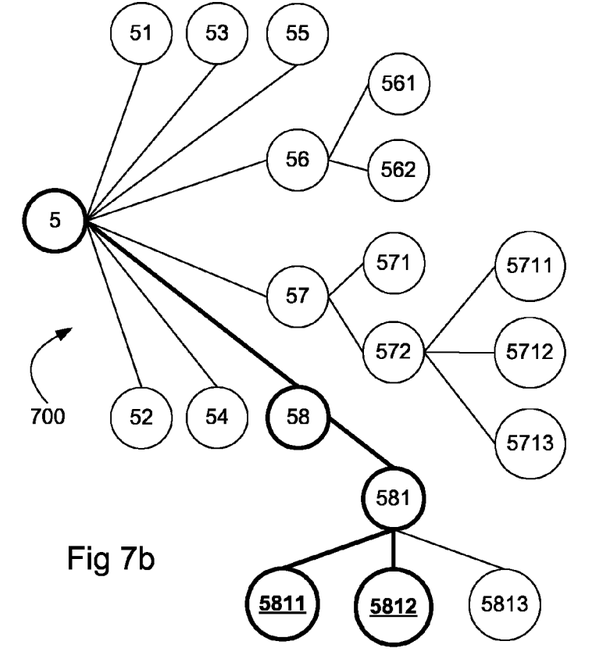

FIG. 7b shows the corresponding traversal of the user interface component tree 700 for the example selection of FIG. 5b. The nodes that have been found to have matching boundaries are marked with a thicker line in FIG. 7b. As can be seen the two leafs 5811 and 5812 have been found and the corresponding fields as indicated by the nodes' OBJECT references are thus selected and analyzed.

Figure 9:
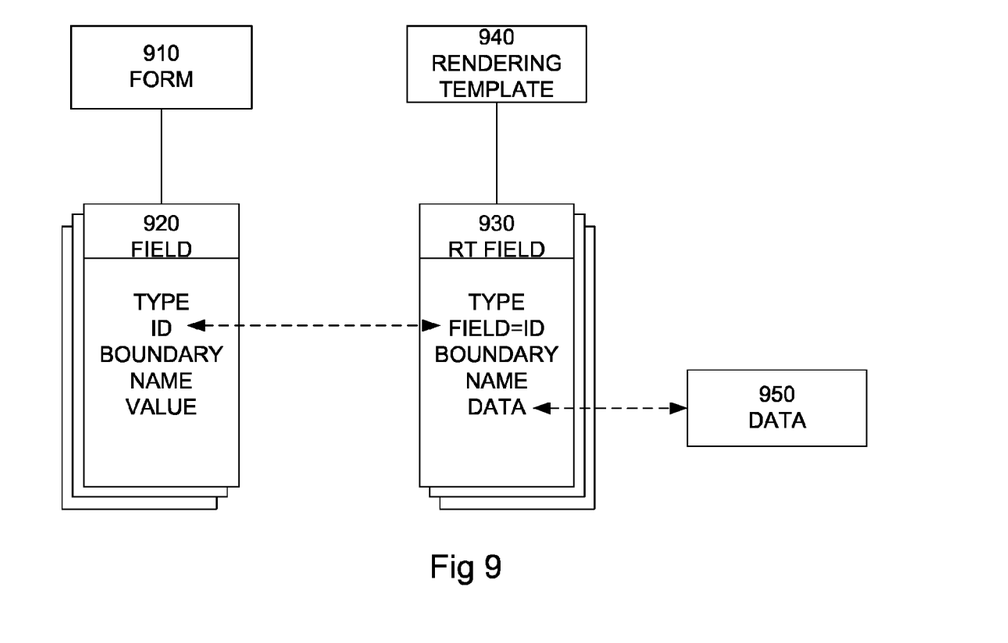
FIG. 9 show a model of a component association according to one embodiment of the teachings of this application.

FIG. 9 shows a schematic view of the data structure of a form and other components according to the teachings herein. A form 910 ahs one or more fields 920. Each field has a type TYPE, an identification ID, a boundaries BOUNDARY, a name NAME and a value VALUE. When a field has not yet been filled in the value is empty.

A field 920 can be one of several types. The most common example of such a type is EDIT, which indicates that the field can be edited. Other examples are: TEXT, CHECK BOX, RADIO BUTTON, COMBO BOX and SCROLL DOWN LIST to name a few.

The controller 210 of the operator terminal 420 is further configured to analyze the selected field(s) 1020. The analysis of a field identifies the corresponding type, name and value. The boundaries of the field are also determined. A rendering template, RT, 940 of the form is generated which is associated with one or several rendering template fields, RT fields, 930. Each RT field 930 carries information on the type, name and value as well as the boundaries of an associated field 920. The field 920 is identified in the RT field 930 by a reference to the identification ID of the field 920.

The RT field 930 also carries a reference DATA to a data object 950 or, alternatively, the RT field carries a data value DATA. The data DATA is the data that is to be input into the field 920.

As the rendering template 940 has been generated fully it is sent 1025 to the desktop of the operator terminal where it is made available to the operator. In the example of FIG. 10 the RT 940 is sent through a network enabled device, such as an internet server 450. This provides an added security measurement as well as it utilizes any data conversion that is already accessible through the server 450 should such be needed.

The RT 940 is then displayed to the operator 1030 and the operator is allowed an opportunity to edit the RT 940. The controller converts 1035 the RT 940 into a graphical representation (RTGUI) of the RT 940 according to the data in the corresponding RT fields 930. The controller 210 of the operator terminal 420 then forwards or sends 1040 the RT GUI to the visitor terminal. As is indicated by the dashed arrow the action of displaying the RT 940 to the operator is optional and in one embodiment the controller is configured to convert and send the RT GUI automatically without any operator involvement. In one embodiment the operator terminal is configured to send the RT GUI via a shared web page over an internet server 450 as has been discussed above and which is disclosed in the patent application titled DYNAMIC SHARING OF A WEBSERVICE and details regarding such sharing are incorporated herein along with the complete document by reference.

It should be noted that although the embodiments disclosed herein are directed at generating and providing a graphical rendering of the fields, it should be noted that the rendering templates for a field may be converted into other rendering forms, such as for text-to-speech through a voice interface instead of a graphical interface. Such voice interface should be understood to be part of the teachings herein and the embodiments disclosed herein are also applicable to voice interfaces.

The visitor terminal 410 is configured to receive and display 1045 the RT GUI as a form, preferably in a web browser as part of a shared view of a web service. By utilizing a web browser for displaying the form several benefits are achieved. For example, the operator becomes independent of the operating system and coding scheme used by the visitor terminal as this is handled automatically by the already existing protocols and technologies of the web server 450 and the web browser 414 of the visitor terminal 410.

Figure 6A:
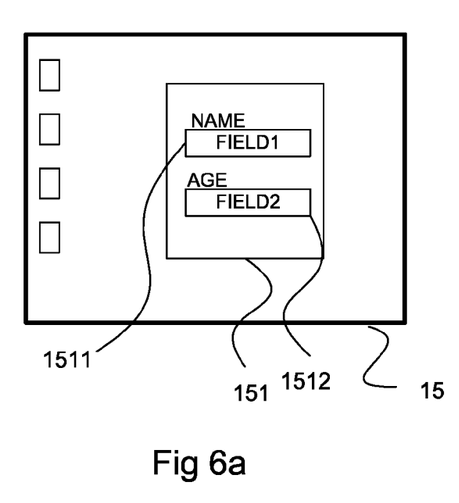
FIGS. 6a and 6b each shows a display view of a visitor terminal according to one embodiment of the teachings of this application.

FIG. 6a shows an example of a user interface view 15 of a visitor terminal 410 according to herein. On the user interface view 15 a form 151 is displayed according to the RT GUI. The form 151 has an upper field 1511 labeled "NAME" and a lower field 1512 labeled "AGE".

The visitor starts filling in 1050B the form 151. In one embodiment and as indicated in FIG. 10 the operator may also fill in 1050A the form 151 through the shared web service view. The data that is filled in is synchronized between the two terminals through the shared view as has been disclosed in the patent application DYNAMIC SHARING OF A WEB SERVICE which is incorporated herein by reference with particular reference to sections on synchronizing the view. In one embodiment the data filled in by the operator is injected in to the data flow for the shared web service to the visitor terminal The data filled in by the visitor terminal is forwarded to and shared with the operator terminal as the data is pushed to the server 450. In one embodiment this is done by the user accepting the data. In another embodiment this is done as a field is filled in.

Figure 5C:
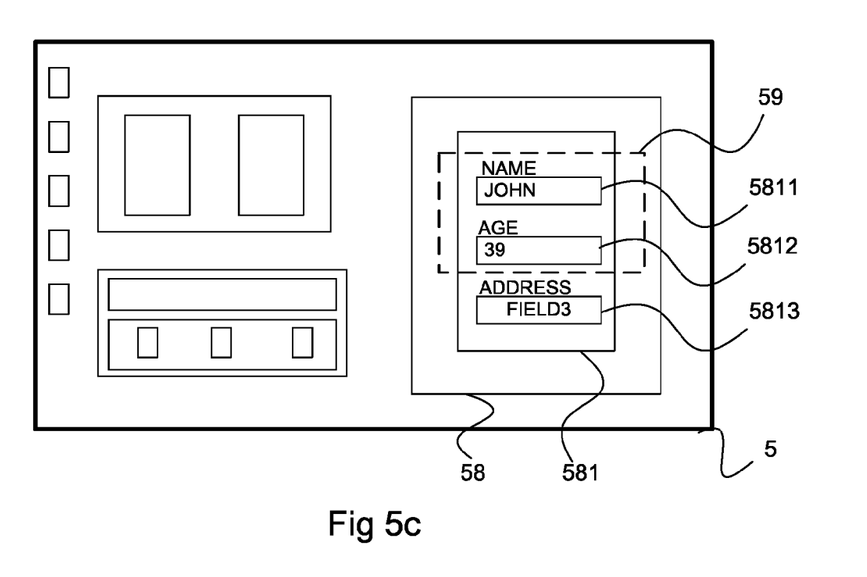
Figure 6B:
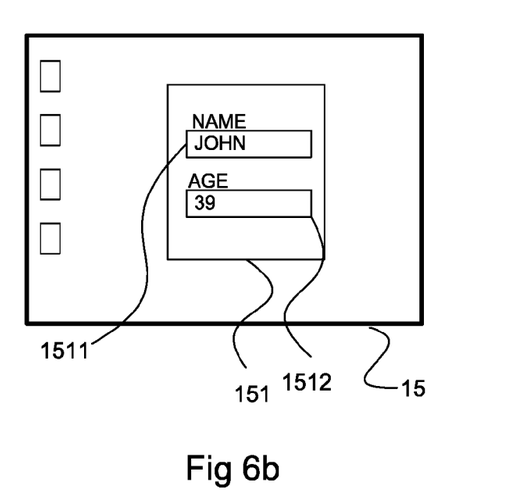

The visitor fills in the data value "JOHN" in the upper field 1511 and the data value "39" in the lower field 1512 as can be seen in FIG. 6b. The server 450 synchronizes 1055 the shared web page view between the visitor terminal 410 and the operator terminal 420 through the internet connection and the user interface view 5 of the operator terminal 420 is updated accordingly as is shown in FIG. 5c.

As the visitor has filled in all the data values for all the fields (or for the fields he is willing to fill in) the user accepts 1060 the filled-in form and the operator terminal 420 is informed via the server 450 over the internet that the form is accepted 1065. The acceptance can be effected through different electronic signing means. Examples of such are electronic signature or electronic bank identities. This allows for a secure acceptance that can be trusted by the operator terminal In one embodiment the acceptance can be effected through the use of a button that the visitor clicks on to indicate that the data is accepted by the visitor. This allows for an easy acceptance. In one embodiment the operator is offered an opportunity to approve 1070 the form, thus allowing the operator the possibility to manually review and approve the data before further actions are executed on the data. This is optional as is indicated by the dashed line in FIG. 10. The operator desktop 423 forwards the data 950 and the accept 1075 to the native application 422, again over the internet, where the RT fields 930 and their corresponding data 950 are matched to the associated fields 920 through the ID association between the RT fields 930 and the fields 920. The data 950 is thus automatically input 1080 into the corresponding fields 920 as if inputted directly by a user.

Advantage is taken by utilizing that the data is data that has been or is to be input by a user and can thus be represented with text regardless of the actual format of the data 950. In one embodiment the data type for the data 950 is simple text, such as ASCII text. This enables the input data 950 to be sent between the applications with a minimum of transformations being done.

By utilizing the internet several advantages are achieved. One advantage is that a logging of data that is transferred between the applications of the operator terminal 420 and between the operator terminal 420 and the visitor terminal 410 are logged. Furthermore the internet and the server 450 acts as a buffer between the native desktop 423 and the native application 422 of the operator terminal 420 thereby preventing the operator desktop and also the visitor to gain any access to the data bases 425. This enables the data bases 425 to maintain their data integrity more easily as the access to the data is limited. Furthermore, due to the versatility of the already existing protocols for the internet it is possible to find use for the teachings herein on and between operating systems and coding standards such as MS Windows®, Apple's™ MAC OS, UNIX™, Linux™, HTML/WML, PDF, JAVA™, and FLASH™ TO NAME A FEW. The server 450 is able to at two points check the data that is to be transmitted between the two terminals and the applications for irregularities and if any data is found to be unsafe it is easily discarded.

Furthermore, only the operator is required to have an account (if any) at the server 450, a data base, or an application, never the visitor, which enables an easier and faster connection for the visitor terminal as no additional trust relationship needs to be established.

This allows for a universal form-handling wherein an operator can take any form from any application or database and share it or parts thereof with a visitor, have the form be filled-in by the visitor and then automatically saving the data in the form.

By utilizing that all data is substantially entered as text, such as ASCII text, through an input means such as a keyboard or a mouse the data can easily be transferred between different operating systems, especially when taking advantage of the already established internet connections and the protocols used therein thus alleviating the need for any specific transformation or conversion of form-specific data.

Figure 11:
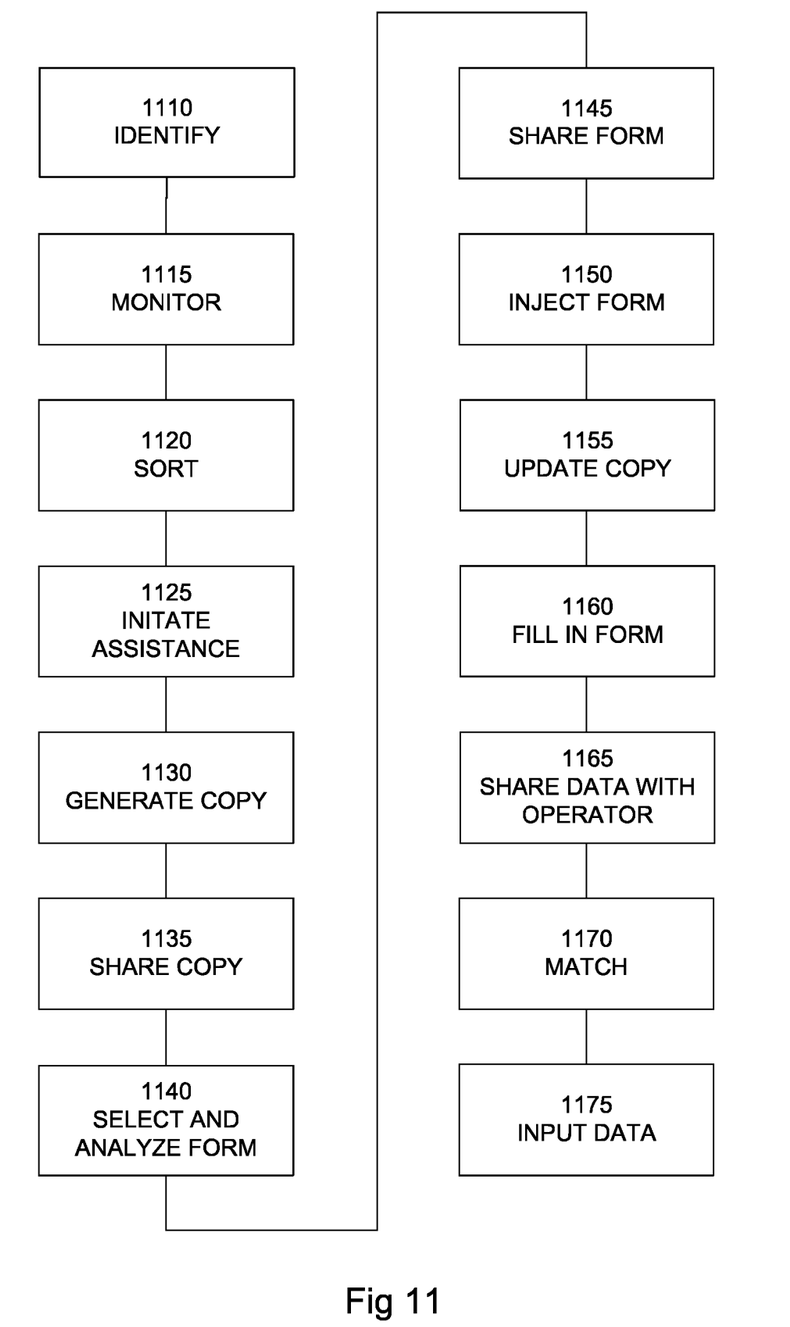
FIG. 11 shows a flowchart for a method according to one embodiment of the teachings of this application.

FIG. 11 shows a flowchart of a combined method according to the teachings of this application and the two patent applications that are incorporated herein by reference, namely the patent application titled DYNAMIC FILTERING AND SORTING OF VISITORS FOR PROVIDING ASSISTANCE and the patent application titled DYNAMIC SHARING OF A WEBSERVICE, filed concurrently with this application and by the same applicant.

A visitor is identified 1110 as he logs on to a web service and is thereafter monitored 1115 for his user behavior to establish whether he is a visitor that would be beneficial to provide assistance to and sorted accordingly 1120. One indication that a visitor is in need of assistance is that he lingers on a form or incorrectly fills in the form repeatedly. An operator or the visitor initiates 1125 an assistance session and a copy of the web service is generated 1130 and shared 1135 between the operator and the visitor. The operator selects a form or a collection of fields and analyzes them and generates a rendering template for the form or collection of fields 1140 that is shared 1145 with the visitor by injecting the rendering template 1150 in the dataflow for the shared view. The view is updated 1155 to display the form or collection of fields and the visitor is able to fill in the form or collection of fields 1160. As the form is filled-in and accepted the data that has been filled in are sent 1165 to the operator where the data for the rendering template is matched with the selected form or collection of fields 1170 and the data is input into the corresponding form or collection of fields 1175.

One benefit of the teachings herein is that an operator is enabled to share any form with a visitor without taking control of any part of the visitor's terminal The operator is further able to do this for one or more specific and targeted visitors. The visitor does not have to take any special action at all, but simply remains connected to or logged on to the same web site. This is thus very simple to use and to understand. Especially if the assistance session is initiated by an operator as it then does not require any action by the visitor.

Another benefit lies in that no direct connection between the operator and the visitor terminal is established. Only the graphical view of a web browser window and simple data that is input is shared. Thus, there may be no need to circumvent any (additional) firewalls as in the prior art and it does not allow another terminal to gain control over the visitor terminal and no changes may be needed in the visitors network setup.

Another benefit of the teachings herein lies in that by using the already established web browser connection established between the visitor and the server no further protocols need to be implemented or installed on the visitor side. This also enables the operator to be independent on the visitor's operating system. All data transformations and transfers are already taken care of by the internet protocol. The teachings herein thus also solve the problem of how to allow the operator to share data with any visitor regardless of the operating system. A manner of sharing forms, such as disclosed herein, thus becomes easy and thereby cheap to install at an operator side as only the version of the operator's operating system need to be implemented or installed.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other devices. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. An operator terminal having access to multiple data bases having different coding standards or operating systems and communicating with at least one visitor terminal to allow the operator to provide support or assistance to a visitor, the operator terminal comprising a memory, a controller, and a display, wherein said controller is configured to:
   execute a first application to output a form to the display, wherein the form includes at least one editable field;
   execute, as a background process, a native application different from the first application and configured to receive an operator selection of one or more editable fields of the at least one editable field on a desktop view of the operator terminal,
   wherein the operator selection of the one or more editable fields is received via a graphical user interface marking indication;
   identify, by the native application, the selected one or more editable fields by matching said graphical user interface marking indication to graphical boundaries of user interface components as output to the display by the first application;
   analyze, by the native application, the identified one or more editable fields by identifying a corresponding type, name, value, and boundaries of the identified one or more editable fields;
   generate, by the native application, a rendering template for the identified one or more editable fields, wherein the rendering template comprises information on the type, name, value, and boundaries of the identified one or more editable fields,
   wherein the configuring the controller to generate, by the native application, the rendering template further comprises configuring the controller to:
      forward, by the native application, information pertaining to the identified one or more editable fields to a server on the internet; and
      receive, by the controller and from the server, the rendering template from the server;
   output, by the native application and to the desktop view on the display, the rendering template, wherein the rendering template is independent of an operating system or coding standard;
   receive manipulation of said rendering template by the operator and via the desktop view; and
   transmit said rendering template with a visitor terminal through a network enabled device as a form; and
   receive, by the native application, form data associated from said visitor terminal responsive to the transmitted rendering template;
   match said received form data to the selected one or more editable fields; and
   input, by the first application, said received form data into said at least one selected field.

2. The terminal according to claim 1, wherein said controller is further configured to identify the selected one or more editable fields by traversing an object graph comprising nodes corresponding to said user interface components.

3. The terminal according to claim 1, wherein said graphical indication indicates the form, said form comprising at least one field, and wherein said controller is configured to select all fields comprised in said form.

4. The terminal according to claim 1, wherein said graphical user interface marking indication indicates an application window comprising a form, said form comprising the at least one editable field, and wherein said controller is configured to select all fields comprised in said form.

5. The terminal according to claim 1, wherein said controller is further configured to receive said selection and to analyze said selection within the first application and to transmit said rendering template within a second application and to effect any communication between the first application and second application directly or through a server over a network.

6. The terminal according to claim 1, wherein said controller is further configured to generate the rendering template that is associated with one or several rendering template fields, each rendering template field being associated with a field.

7. The terminal according to claim 6, wherein said rendering template field is further associated with a data object being associated with a data value or, alternatively, said rendering template field comprises a data value, wherein said data value is the data value that is to be input into said field.

8. The terminal according to claim 1, wherein said controller is further configured to generate a graphical representation of said rendering template and to transmit said graphical representation of said rendering template automatically without any operator involvement to said visitor terminal through a server over the internet.

9. A method of allowing an operator to provide support or assistance to a visitor using an operator terminal having access to multiple data bases having different coding standards or operating systems and communicating with at least one visitor terminal, the operator terminal comprising a controller, a memory, and a display, said method comprising:
   executing a first application to output a form to the display, wherein the form includes at least one editable field;
   executing, as a background process, a native application different from the first application and configured to receive, via the native application, an operator selection of one or more editable fields of the at least one editable field on a desktop view of the operator terminal,
   wherein the operator selection of the one or more editable fields is received via a graphical user interface marking indication;
   identifying, by the native application, the selected one or more editable fields by matching said graphical user interface marking indication to graphical boundaries of user interface components as output to the display by the first application;
   analyzing, by the native application, the identified one or more editable fields by identifying a corresponding type, name, value, and boundaries of the identified one or more editable fields;

generating, by the native application, a rendering template for the identified one or more editable fields, wherein the rendering template comprises information on the type, name, value, and boundaries of the identified one or more editable fields, wherein generating, by the native application, the rendering template further comprises:

forwarding, by the native application, information pertaining to the identified one or more editable fields to a server on the internet; and     receiving, by the controller and from the server, the rendering template from the server;

outputting, by the native application and to the desktop view on the display, the rendering template, wherein the rendering template is independent of an operating system or coding standard;

receiving manipulation of said rendering template by the operator and via the desktop view; and transmitting said rendering template with a visitor terminal through a network enabled device as a form;

receiving form data associated from said visitor terminal responsive to the transmitted rendering template;

matching said received form data to the selected one or more editable fields; and inputting, by the first application, said received form data into said at least one selected field.

10. The method according to claim 9, further comprising receiving data being associated with said rendering template from said visitor terminal;

matching said received data to said at least one selected field; and inputting said received data into said at least one selected field.

11. The method according to claim 9, further comprising identifying at least one customer terminal as the customer terminal accesses a web service;

monitor actions taken by said customer terminal;

sorting said customer terminal;

initiating an assistance session;

generating a copy of said web service;

providing said copy to said customer terminal and an operator terminal thereby sharing the customer specific copy between the customer terminal and the operator terminal; and sharing said rendering template by injecting said rendering template into a data flow established between said customer terminal and said server.

12. A non-transitory computer readable storage medium storing a program encoded with instructions, such that the program when executed causes a processor to perform the method according to claim 9.

\* \* \* \* \*